Patented Nov. 12, 1940

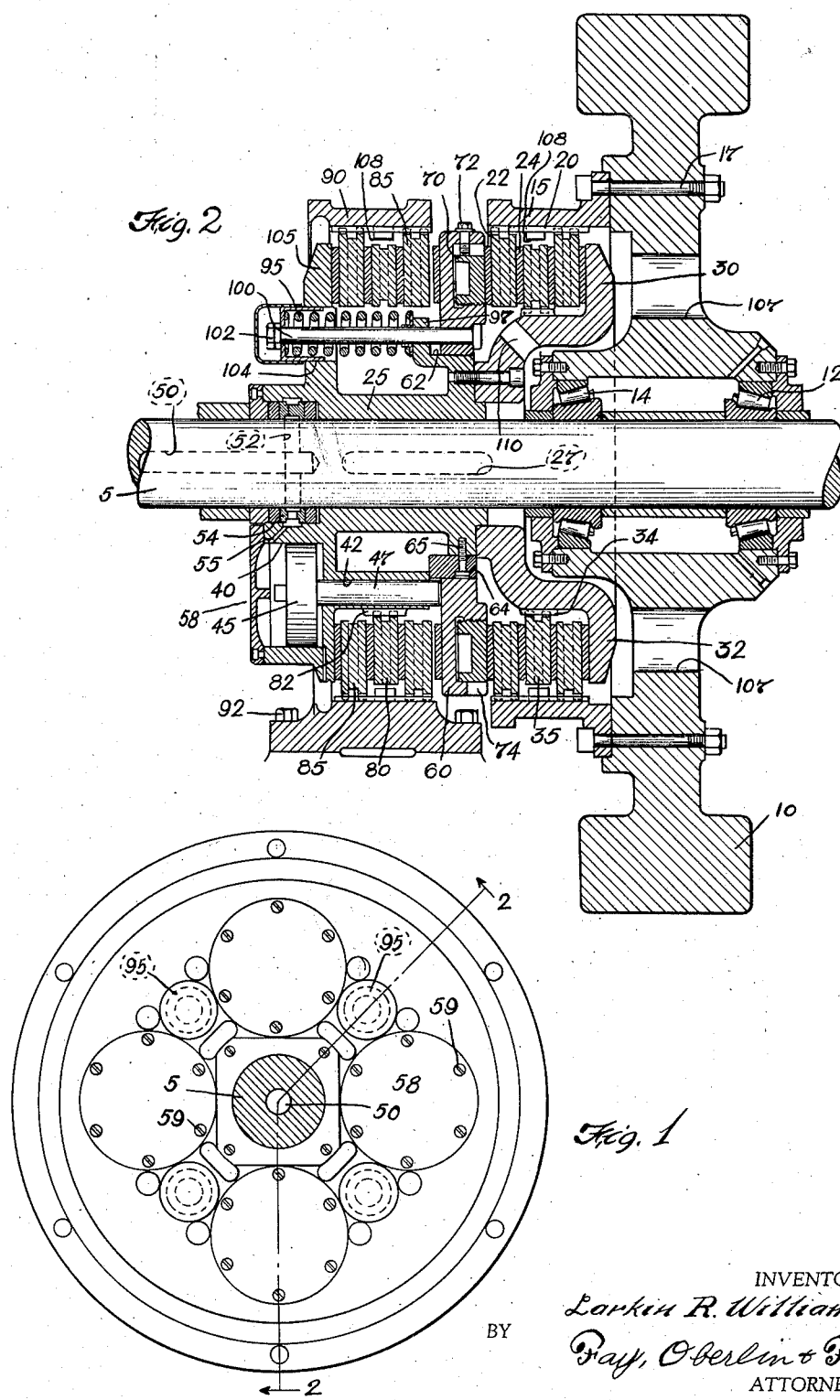

2,221,014

UNITED STATES PATENT OFFICE 2,221,014

CLUTCH AND BRAKE UNIT

Larkin R. Williamson, Cincinnati, Ohio, assignor to E. W. Bliss Company, Brooklyn, N. Y., a corporation of Delaware Application May 18, 1938, Serial No. 208,634

16 Claims. (Cl. 192—18)

This invention relates to drive mechanism and more particularly to a drive establishing clutch and a drive terminating brake.

It is old to combine a brake and a clutch and to actuate the former when the latter is disconnected. Such units in the past, however, have been difficult to disassemble for replacement and repair. These units are normally located in machinery in positions which render access to them difficult. Further, they are usually confined against endwise shifting and hence must be removed from the machine before they may be dismantled.

This is especially true in units used in machinery where volumetric space available is at a minimum as in presses and in similar equipment. Further, in such uses the clutch and brake unit is normally positioned on a shaft and between two portions of the main frame. Thus it is not possible to disassemble the unit by axial shifting, especially since the clutch portion is normally bolted to the flywheel.

It has been a chief object of my invention to provide a clutch and brake unit which may be readily disassembled without removing the same from the machine and without involving large periods of time. A further object of my invention has been to provide a unit which may be substantially dismantled from the end opposite the flywheel. Still an additional object has been to space the removable parts a sufficient distance from the supporting shaft as will eliminate the necessity for removing the unit from its supported position.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various means in which the principle of the invention may be used.

In said annexed drawing:

Fig. 1 is an end view of my clutch and brake unit viewed from the end opposite the flywheel; and Fig. 2 is a section through Fig. 1, as indicated by the lines 2—2 thereon.

The clutch and brake unit comprising my invention is in general intended for use in presses and like equipment, although it is not intended to so limit its application. With such uses in mind however, and referring to Fig. 2, it will be seen that I provide the usual press drive shaft 5 which is normally located in the crown and in driving relation with the crank by which the die slide is reciprocated. The shaft is operatively driven by connection with a flywheel 10 which also acts as a belt wheel for a driving pulley and is idly carried on the shaft 5 on tapered bearings 12 and 14.

The clutch element is carried by the flywheel and in position to engage with a clutch element carried by the shaft to drive the latter through the flywheel. A clutch shell 15 is secured within a recessed portion of the flywheel 10 by suitable bolts 17. The internal portion of the shell is provided with a series of internal teeth 20, in which are accommodated a pair of plates 22 provided on each side with friction facing 24 and engaged as hereafter described by similar plates slidably secured to the shaft 5.

The greater part of the mechanism comprising my invention rotates with the shaft 5. As best shown in Fig. 2, I provide a cage 25 bored to receive the shaft 5 and suitably keyed thereto as at 27. Bolted to the cage 25 is a clutch carrier 30 provided with an annular outstanding flange portion 32. The clutch carrier has formed therein a series of teeth 34 on the exterior portion corresponding to the interior teeth 20 of the ring 15. A friction plate 35, toothed on the interior portion, slidably engages and is rotatably carried by the teeth 34. A drive between the flywheel and the shaft is thus established when the friction faces of the plate 35 and the plates 22 are in engagement.

Pistons operated by fluid pressure engage the clutch plates. In the cage 25 remote from the clutch carrier are formed four cylinders 40, each provided with a portion of reduced bore 42 extending coaxially with the cylinder bore. A piston 45 is carried in each cylinder and a rod 47 in each portion of reduced diameter in position to be pushed to the right, Fig. 2, when the piston is subjected to fluid pressure.

To actuate the pistons the shaft 5 is drilled axially, as at 50, and cross drilled at 52 to permit the travel of fluid from the shaft end to a region adjacent the pistons. The open faces of the hole 52 discharge into a recessed portion of the cage 25 which, at its edges, carries a packing 54 to prevent end leaks. Four drilled holes 55 lead from the recessed portion to each of the four cylinders and thus transmit working pressure against the piston head. To provide an effective seal for each cylinder and yet permit ready access to the cylinders independently a separate cap 58 is bolted, as at 59, over each piston to the cage 25.

A shifting ring located between the clutch and brake plates is moved to engage the frame when fluid under pressure is supplied to the axial hole 50. This ring is designated at 60 and rides on a short cylindrical portion 62 of the cage 25. To prevent rotation of the ring with respect to the cage, four clutch ring drive keys 64 each ride in recessed portions of the ring 60 and are bolted as at 65 to the cage.

A second ring, indicated at 70, is threadingly carried by the ring 60 on threads which permit the two rings to be axially moved with respect to each other. This permits the rings to be adjusted to take up play between the clutch plates and the brake plates hereafter described. When the two rings are located in an adjusted position they are secured by lock nuts 72. The inner ring is shifted with respect to the outer one by suitable wrench holes drilled in the periphery thereof and to which access is attained by the cutaway portions 74 of the ring 60.

From the foregoing description it will be understood how the clutch plates 22 and 35 are engaged to drive the shaft 5 from the flywheel 10. Fluid under pressure is supplied to the axial hole 50 and passes through the cage holes 55 to each of the four cylinders 40 where it acts against the pistons 45. Movement of the pistons to the right, Fig. 2, forces the rods 42 against the ring 60, which acts through its connected ring 70 to shift the plates 22 and 35 to the right until prevented from further movement by the flange 32 of the clutch carrier. Since the fluid pressure will be sufficient to maintain the friction surfaces in contact at this point, the flywheel will cause the shaft to rotate.

After the operative cycle of the machine has been completed it is desirable to disconnect the drive by separating the clutch plates and it is further desirable to quickly terminate rotation of the shaft 5 by applying a braking action thereto.

Such braking action is effected by a series of friction plates similar to those already described in connection with the clutch mechanism. Thus, a plate 80 is carried for rotation with the cage 25 by a series of teeth 82 on a short cylindrical surface of said cage and which are engaged by corresponding teeth in the friction plate. On either side of the plate 80 are plates 85 provided with teeth on their exterior portions which engage with teeth on the internal portion of a brake frame 90, which is bolted at 92 to the machine main frame.

Spring mechanism automatically disengages the clutch and applies the brake when fluid pressure against the pistons is released. This is accomplished by four strong springs 95 spaced between respective cylinders 40 and with their axes substantially the same radial distance from the shaft axis as are the axes of the cylinders. One end of each spring bears against an outwardly extending flange 97 formed as an extension of the cage 25. The flange is drilled to accommodate a bolt 100 passing through each spring and capped by a pair of lock nuts 102 bearing against a double washer 104 to compress the spring between the washer and the flange 97. In accomplishing this the ring 60 is drawn to the left, Fig. 2. It thus bears against the plates 80 and 85, forcing them to the left until further movement is stopped by an annular flange 105 formed integral with the cage 25. The nuts 102 are adjusted to normally exert enough pressure on the ring 60 to force the brake plates together with sufficient power to stop the rotating shaft 5, and the parts driven thereby.

From the above description it will be apparent that when the fluid pressure in the cylinders 40 is released the springs are free to act to draw the ring 60 to the left, Fig. 2, and apply the brake. This motion also removes the force holding the clutch plates in engagement and permits the flywheel 10 to revolve idly on the shaft 5 unconnected thereto. As fluid pressure is again applied against the pistons the four springs are again compressed by movement of the ring away from the brake plates and into engagement with the clutch plates.

During continued operation of the parts the friction surfaces of the plates tend to become hot, due to the sliding engagement between them. I provide for dissipation of this heat energy by forming vanes 108 on the internal portion of the clutch ring 15 at predetermined intervals between segments of the teeth 20. The flywheel 10 is provided with a series of circumferentially extending holes 107 which permit passage of air currents therethrough to cool the interior of my mechanism under the "fanning" influence of the vanes. Thus as the flywheel rotates, circulation of air is established adjacent the plates and cooling is accomplished through the holes 107 as well as through openings 110 in the clutch carrier.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A friction drive member comprising a brake and a clutch, a shaft, a cage rotatable with said shaft, a plurality of friction surfaces comprising the clutch and a plurality of friction surfaces comprising the brake, a member between the clutch and brake surfaces and slidable with respect to the cage to engage and disengage said surfaces, piston means disposed off the axis of said shaft on an opposite side of one set of friction surfaces from the said member to shift the member by movement of said piston, fluid means to actuate said piston means and move said member to engage said clutch surfaces, and means to withdraw said member from coacting position with the clutch and urge the same into coacting relation with the brake surfaces.

2. A friction drive member comprising a brake and a clutch, a shaft, a cage rotatable with said shaft, a plurality of friction surfaces comprising the clutch and a plurality of friction surfaces comprising the brake, a ring between the clutch and brake surfaces and slidable with respect to the cage to alternately engage with the clutch and brake surfaces, piston means on the opposite side of the brake from said ring to shift the ring by movement of said piston, fluid means to actuate said piston and move said ring to engage said clutch surfaces and means to withdraw said ring from coacting position with the clutch and urge the same into coacting relation with the brake.

3. A friction drive member comprising a brake and a clutch, a shaft, a cage rotatable with said shaft, a plurality of friction surfaces comprising the clutch and a plurality of friction surfaces comprising the brake, a ring between the clutch and brake surfaces and slidable with respect to the cage, a plurality of cylinders in said cage on the opposite side of one set of friction surfaces from said ring, pistons in said cylinders operatively connected to the ring, fluid means to actuate said pistons and move said ring to engage said clutch surfaces and means to withdraw said ring from coacting position with the clutch and urge the same into coacting relation with the brake.

4. A friction drive member comprising a brake and a clutch, a shaft, a cage rotatable with said shaft, a plurality of friction surfaces comprising the clutch and a plurality of friction surfaces comprising the brake, a ring concentric with the shaft and adjustable in axial thickness parallel to the shaft and disposed between the clutch and brake surfaces and slidable with respect to the cage, piston means on the opposite side of one set of friction surfaces from the ring and adapted to shift the ring by movement of the said piston means, fluid means to actuate said piston means and move said ring to engage said clutch surfaces, and means to withdraw said ring from coacting position with the clutch and urge the same into coacting relation with the brake.

5. A friction drive member comprising a brake and a clutch, a shaft, a cage rotatable with said shaft, a plurality of friction surfaces comprising the clutch and a plurality of friction surfaces comprising the brake, a ring operatively disposed between said clutch and brake surfaces to alternately engage the same and surrounding said shaft and slidable on said cage, a cylinder in said cage, a piston in said cylinder connected to said ring, fluid means to actuate said piston and shift said ring to engage said clutch surfaces, part of said cage shaped to provide a radial shoulder, rods passing from said ring through said shoulder, springs interposed between the free ends of said rods and said shoulder normally tending to draw said ring towards said shoulder and apply the brake, said fluid means acting to release said brake by shifting said ring.

6. A friction drive member comprising a brake and a clutch, a shaft, a cage rotatable with said shaft, a plurality of friction surfaces comprising the clutch and a plurality of friction surfaces comprising the brake, a ring operatively disposed between said clutch and brake surfaces to alternately engage the same and surrounding said shaft and slidable on said cage, a plurality of annularly spaced cylinders in said cage, a piston in each cylinder, fluid means to actuate said pistons and shift said ring to engage said clutch surfaces, part of said cage shaped to provide a radial shoulder, rods passing from said ring through said shoulder, springs interposed between the free ends of said rods and said shoulder normally tending to draw said ring towards said shoulder and apply the brake, said fluid means acting to release said brake by shifting said ring.

7. A friction drive member comprising a brake and a clutch, a shaft, a cage rotatable with said shaft, a plurality of friction surfaces comprising the brake and radially spaced from said shaft, a ring operatively disposed between said clutch and brake surfaces to engage and release the same and surrounding said shaft and slidable on said cage, a cylinder in said cage, a piston in said cylinder connected to said ring, fluid means to actuate said piston and shift said ring to engage said clutch surfaces, part of said cage shaped to provide a radial shoulder of less diameter than the internal diameter of said brake friction surfaces and disposed therewithin, rods passing from said ring through said shoulder and between said shaft and said brake friction surfaces, springs interposed between the free ends of said rods and said shoulder normally tending to draw said ring toward said shoulder and apply the brake, said fluid means acting to release said brake by shifting said ring.

8. A friction drive member comprising a brake and a clutch, a shaft, a cage rotatable with said shaft, a plurality of friction surfaces comprising the clutch and a plurality of friction surfaces comprising the brake and radially spaced from said shaft, a ring operatively disposed between said clutch and brake surfaces to engage and release the same and surrounding said shaft and slidable on said cage, a plurality of cylinders in said cage, pistons in said cylinders connected to said ring, fluid means to actuate said piston and shift said ring to engage said clutch surfaces, part of said cage shaped to provide a radial shoulder of less diameter than the internal diameter of said brake friction surfaces and disposed therewithin, rods passing from said ring through said shoulder and between said shaft and said brake friction surfaces, said rods being respectively annularly spaced between the extended axes of said cylinders, springs interposed between the free ends of said rods and said shoulder normally tending to draw said ring toward said shoulder and apply the brake, said fluid means acting to release said brake by shifting said ring.

9. A friction drive unit comprising a shaft, a cage carried thereby, an element adapted to be connected to said shaft, a friction plate carried by the shaft and element respectively and movable with respect to each other to become engaged and disengaged, a flange integral with said cage and overlying one end of said plates, a ring slidably carried on said cage and overlying the other end of said plates, a portion of said cage formed with a radial shoulder between said ring and said flange, rods connecting said ring and passing through said shoulder and radially disposed between said friction plates and said shaft and springs bearing against said shoulder and surrounding said rods and normally tending to shift said ring to frictionally engage said friction members.

10. A friction drive unit comprising a shaft, an element adapted to be connected to said shaft, a plurality of friction plates constrained against rotation and carried by said element concentric with the axis of said shaft and slidable with respect to said element in a direction parallel to said axis, a cage secured to said shaft, another friction plate carried by said cage and slidable with respect to said cage in a direction parallel to said axis, said other plate being interposed between said plurality of plates to form a group of plates, a flange integral with said cage and overlying one end of said group of plates, a ring slidably carried on said cage and overlying the other end of said group of plates, a portion of said cage formed with a radial shoulder between said ring and said flange, rods connecting said ring and passing through said shoulder and radially disposed between said friction plates and said shaft and springs bearing against said shoulder and surrounding said rods and normally tending to shift said ring to cause engagement of said friction plates.

11. A friction drive unit comprising a shaft, an element adapted to be connected to said shaft, a plurality of friction plates constrained against rotation and carried by said element concentric with the axis of said shaft and slidable with respect to said element in a direction parallel to said axis, a cage secured to said shaft, another friction plate interposed between said plurality of plates, to form a group of plates, said other plates being carried by said cage and slidable with respect to said cage in a direction parallel to said axis, a flange integral with said cage and overlying one end of said group of plates, a ring slidably carried on said cage and overlying the other end of said group of plates, a portion of said cage formed with a radial shoulder between said ring and said flange, rods connecting said ring and passing through said shoulder and radially disposed between said friction plates and said shaft and springs bearing against said shoulder and surrounding said rods and normally tending to shift said ring to cause engagement of said plates, and fluid means operative through the region between said friction plates and said shaft to shift said ring with respect to said plates and release the friction connection therebetween.

12. A friction drive unit comprising a shaft, an element adapted to be connected to said shaft, a plurality of friction plates carried by said element concentric with the axis of said shaft and slidable with respect to said element in a direction parallel to said axis, a cage secured to said shaft, another friction plate carried by said cage and slidable with respect to said cage in a direction parallel to said axis, said other plate being interposed between said plurality of plates to form a group of plates, a ring positioned to one side of said group of plates and shiftable parallel to said axis to cause engagement and disengagement of the same, an auxiliary extensible member carried by said ring and adapted to be positioned with respect to said ring to vary the axial thickness of the space occupied by said ring and said member and compensating for end play in said friction plates, and power means disposed to one side of said ring and said member to shift the same.

13. A friction drive unit comprising a shaft, an element adapted to be connected to said shaft, a plurality of friction plates carried by said element concentric with the axis of said shaft and slidable with respect to said element in a direction parallel to said axis, a cage secured to said shaft, another friction plate carried by said cage and slidable with respect thereto in a direction parallel to said axis, said other plate being interposed between said plurality of plates to form a group of plates, a ring shiftable with respect to said axis, a second ring carried by said first ring and adapted to be positioned with respect to said first ring to vary the axial thickness of the space occupied by said rings and compensate for end play in said friction plates, and power means disposed to one side of said rings to shift the same.

14. A friction drive element comprising a cage bored axially to accommodate a shaft, an annular flange portion at one end of said cage normal to said bore to axially constrain a friction brake plate, a plurality of extensions of said flange on the face opposite said plate constraining side, cylinder bores formed in said extensions, a second flange portion on said cage at the end opposite said first flange and spaced therefrom and bores in said second flange portion spaced annularly between the extended axes of the cylinder bores in said first portion.

15. A combination brake and clutch unit including a brake element fixed with respect to a base, a shaft, a member rotatable with respect to said shaft and carried thereon, and a clutch and brake unit comprising a cage fixed to said shaft, a plurality of interdisposed friction plates carried by said cage and brake element respectively, a plurality of interdisposed friction plates carried by said cage and rotatable member respectively, a ring disposed between said sets of friction plates and shiftable axially of said shaft to engage the friction plates of either set as desired, a plurality of cylinders in said cage exterior of the region bounded by the said friction plates and on the opposite side of said brake plates from said ring, pistons in said cylinders, push rods connecting said pistons and said ring and lying between said brake plates and the shaft, part of said cage shaped to provide a radial shoulder, rods passing from said ring through said shoulder, springs interposed between the free ends of said rods and said shoulder normally tending to draw said ring toward said shoulder and apply the brake, said fluid means acting to release said brake by shifting said ring.

16. A friction drive comprising a brake and a clutch, a shaft, two sets of friction surfaces carried concentrically with said shaft, one of said sets comprising a clutch and the other comprising a brake, a member interposed between said sets, means to permit relative engaging and disengaging movement between said member and one of said sets respectively to thereby alternatively engage said clutch surfaces or said brake surfaces, an element rotatably carried with said shaft, fluid means carried by said element on the opposite side of one of said sets from said member, said fluid means being operable to effect a relative bodily shifting between one of said sets and said member to thereby establish a friction grip between the friction surfaces of said one set and means operable on releasing said fluid means to effect a bodily shifting between said member and the other of said sets with respect to each other to release the friction grip between said first set of friction surfaces and establish a friction grip between the other set of said friction surfaces.

LARKIN R. WILLIAMSON.